US 8,054,904 B2

United States Patent
Hwang et al.

(10) Patent No.: US 8,054,904 B2
(45) Date of Patent: Nov. 8, 2011

(54) PARTIAL ITERATIVE DETECTION AND DECODING APPARATUS AND METHOD IN MIMO SYSTEM

(75) Inventors: Keun-Chul Hwang, Seongnam-si (KR); Sung-Woo Park, Suwon-si (KR); Soon-Young Yoon, Seoul (KR); Young-Hoon Kwon, Seongnam-si (KR); June Moon, Seoul (KR)

(73) Assignee: Samsung Electronics Co., Ltd (KR)

( * ) Notice: Subject to any disclaimer, the term of this patent is extended or adjusted under 35 U.S.C. 154(b) by 1363 days.

(21) Appl. No.: 11/638,785

(22) Filed: Dec. 14, 2006

(65) Prior Publication Data

US 2007/0150797 A1    Jun. 28, 2007

(30) Foreign Application Priority Data

Dec. 14, 2005  (KR) .............................. 2005-0123014

(51) Int. Cl.
*H04B 7/02*  (2006.01)

(52) U.S. Cl. ........ 375/267; 375/260; 375/148; 375/340; 375/316

(58) Field of Classification Search .................. 375/267, 375/260, 148, 340, 316; 455/132, 504; 714/781
See application file for complete search history.

(56) References Cited

U.S. PATENT DOCUMENTS

| 6,310,887 | B1 * | 10/2001 | Hatakeyama | 370/465 |
|---|---|---|---|---|
| 7,526,037 | B2 * | 4/2009 | Hoo | 375/267 |
| 2002/0186800 | A1 * | 12/2002 | Berthet et al. | 375/347 |
| 2003/0103584 | A1 | 6/2003 | Bjerke et al. | |
| 2003/0154435 | A1 | 8/2003 | Claussen et al. | |
| 2004/0038653 | A1 * | 2/2004 | Claussen et al. | 455/130 |
| 2004/0136452 | A1 * | 7/2004 | Feldman et al. | 375/227 |
| 2005/0157811 | A1 | 7/2005 | Bjerke et al. | |
| 2006/0197700 | A1 * | 9/2006 | Stevens et al. | 342/37 |
| 2009/0055717 | A1 * | 2/2009 | Au et al. | 714/784 |

FOREIGN PATENT DOCUMENTS

KR       1020020086166       11/2002

* cited by examiner

*Primary Examiner* — Shuwang Liu
*Assistant Examiner* — Helene Tayong
(74) *Attorney, Agent, or Firm* — The Farrell Law Firm, P.C.

(57) ABSTRACT

A partial iterative detection and decoding apparatus in a Multiple Input Multiple Output (MIMO) system includes a detector for detecting signals received through at least one receive antenna to generate a first soft decision value, a decoder for decoding the first soft decision value to generate a second soft decision value, and a reliability determiner for determining a signal to be iteratively detected and decoded by using the second soft decision value. Accordingly, the complexity of the receiver is reduced and the number of iterations limited due to the complexity is increased, thereby improving the performance of the receiver.

37 Claims, 7 Drawing Sheets

| ITERATION | 12dB % OF UPDATE | 13dB % OF UPDATE | 14dB % OF UPDATE | 15dB % OF UPDATE |
|---|---|---|---|---|
| 1 | 17.8% | 9.8% | 5.0% | 2.5% |
| 2 | 13.6% | 6.8% | 3.3% | 1.6% |
| 3 | 8.2% | 3.3% | 1.4% | 0.6% |
| 4 | 6.4% | 2.7% | 1.3% | 0.6% |
| 5 | 5.6% | 2.5% | 1.2% | 0.6% |
| 6 | 5.3% | 2.5% | 1.2% | 0.6% |
| 7 | 5.1% | 2.4% | 1.2% | 0.6% |
| 8 | 4.9% | 2.4% | 1.2% | 0.6% |
| 9 | 4.8% | 2.4% | 1.2% | 0.6% |
| 10 | 4.8% | 2.4% | 1.2% | 0.6% |
| 11 | 4.7% | 2.4% | 1.2% | 0.6% |
| 12 | 4.7% | 2.4% | 1.2% | 0.6% |

(% OF UPDATE) = (# OF UPDATED MIMO LLR BLOCKS) / (# OF ALL MIMO LLR BLOCKS)

FIG.7

PARTIAL ITERATIVE DETECTION AND DECODING APPARATUS AND METHOD IN MIMO SYSTEM

PRIORITY

This application claims priority under 35 U.S.C. §119 to an application filed in the Korean Intellectual Property Office on Dec. 14, 2005 and allocated Serial No. 2005-123014, the contents of which are incorporated herein by reference.

BACKGROUND OF THE INVENTION

1. Field of the Invention

The present invention relates generally to a Multiple Input Multiple Output (MIMO) system, and in particular, to a partial iterative detection and decoding apparatus and method in a MIMO system.

2. Description of the Related Art

Due to the rapid growth of mobile communication markets, various multimedia services for wireless environment are under high demand. In order to provide the multimedia services, a large capacity of Transmit (TX) data and a high speed of data transfer are in progress. Therefore, it is most important to develop methods for efficiently using the limited frequencies in the wireless communication systems. To do so, wireless communication systems require new transfer techniques using multiple antennas.

One of the new transfer techniques is a MIMO system that uses multiple antennas at a transmitter and a receiver. Compared with a system using a single antenna, this MIMO system can increase channel capacity in proportion to the number of antennas without additional frequency or transmission power allocation.

MIMO technologies are classified into a spatial diversity scheme, a spatial multiplexing scheme, and a combination scheme of spatial diversity and spatial multiplexing. The spatial diversity scheme can obtain a diversity gain corresponding to a product of the number of TX and Receive (RX) antennas, improving transmission reliability. The spatial multiplexing scheme can increase the data rate by simultaneously transmitting a plurality of data streams.

When the spatial multiplexing scheme is used in the MIMO system, mutual interference occurs between the transmitted data streams. Therefore, the receiver detects signals using a Maximum Likelihood (ML) considering the influence of interference signal, or detects signals after interference cancellation. Examples of the interference cancellation scheme include Zero Forcing (ZF) and Minimum Mean Square Error (MMSE).

However, the ML receiver has a drawback in that the complexity increases in proportion to a square of the number of TX antennas and the length of a codeword. Therefore, research on reception algorithms has been conducted to reduce the calculation complexity of the receiver and obtain the performance close to that of the ML receiver.

In addition, the MIMO system uses an Iterative Detection and Decoding (IDD) scheme in which a turbo principle is applied to a MIMO receiver. In the MIMO IDD scheme, a single coder is concatenated with a channel coder and a MIMO coder. Thus, a MIMO detector of the MIMO receiver detects a signal received through an antenna and outputs the detection signal to a channel decoder. The channel decoder improves a bit performance by decoding the detection signal output from the MIMO detector and feeds back the decoded signal to the MIMO detector. The MIMO detector again generates a detection signal using the feedback signal. The MIMO receiver iteratively performs the above-described procedures. Examples of the MIMO IDD scheme include a list MIMO scheme and a turbo blast scheme. The two schemes have the same IDD scheme as the spatial multiplexing scheme of the transmitter, but are different in terms of the detection of the MIMO signal.

Figure 1:
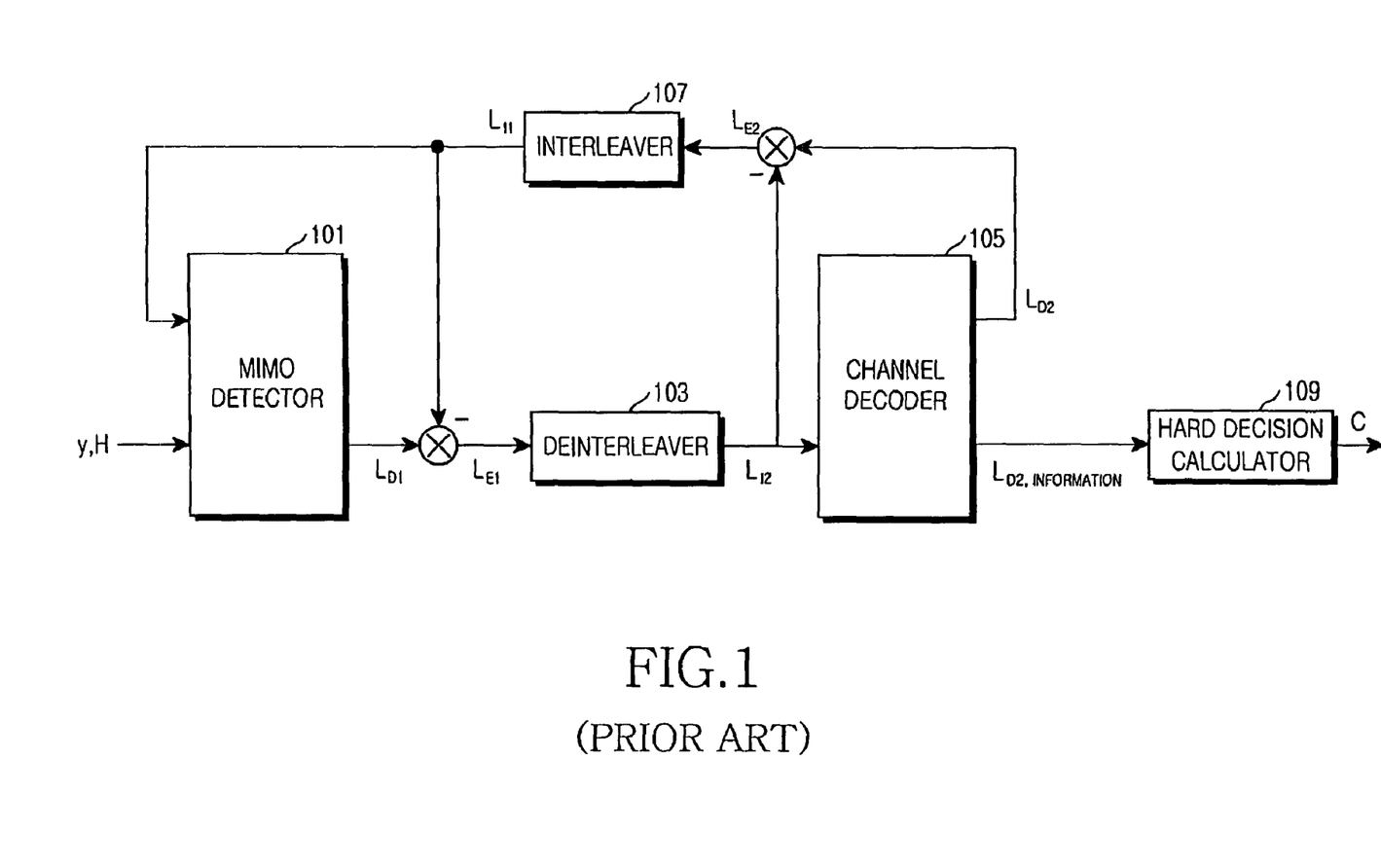
FIG. 1 is a diagram of a conventional MIMO IDD receiver.

FIG. 1 is a diagram of a conventional MIMO IDD receiver.

Referring to FIG. 1, when a signal is received, a MIMO detector 101 detects the received signal and generates a first soft decision data to a channel decoder 105. The soft decision data indicates a Log Likelihood Ratio (LLR).

The channel decoder 105 decodes each bit using the first soft decision data as priori information and calculates a second soft decision value. That is, the channel decoder 105 corrects an error by decoding the first soft decision data.

The second soft decision value calculated by the channel decoder 105 is fed back to the MIMO detector 101 and is used as the priori information for the IDD. By repeating these procedures, the reliability of the received bits can be improved.

The MIMO IDD scheme recalculates the soft decision value by performing the IDD of the soft decision value calculated from the separated detector and decoder, thereby improving the performance of the MIMO system. However, because the IDD scheme calculates as many LLRs as the size of the coding blocks of the detector and decoder in each iteration, the complexity of the system increases as a total number of iterations increases.

SUMMARY OF THE INVENTION

An object of the present invention is to substantially solve at least the above problems and/or disadvantages and to provide at least the advantages below. Accordingly, an object of the present invention is to provide an apparatus and method for reducing the complexity of a receiver in a MIMO IDD system.

Another object of the present invention is to provide an apparatus and method for reducing the complexity of a receiver by performing a partial IDD only on a bit having a low reliability in a detected or decoded signal in a MIMO IDD system.

A further object of the present invention is to provide an apparatus and method for reducing recalculation of a soft decision value by performing an IDD only on a bit having a low reliability in a MIMO IDD system.

According to the present invention, a partial iterative detection and decoding apparatus in a MIMO system includes a detector for detecting signals received through at least one receive antenna to generate a first soft decision value, a decoder for decoding the first soft decision value to generate a second soft decision value, and a reliability determiner for determining a signal to be iteratively detected and decoded by using the second soft decision value.

According to the present invention, a partial iterative detection and decoding apparatus in a MIMO system includes a detector for detecting signals received through at least one antenna to generate a first soft decision value, a decoder for decoding the first soft decision value to generate a second soft decision value and a reliability determiner for measuring a magnitude of the first soft decision value and determining a signal to be iteratively detected and decoded among the second soft decision value.

According to the present invention, a partial iterative detection and decoding apparatus in a MIMO system includes a detector for detecting signals received through at least one antenna to generate a first soft decision value, a decoder for decoding the first soft decision value to generate a second soft decision value, and a reliability determiner for determining a signal to be iteratively detected and decoded among the second soft decision values according to channel state of the received signal.

According to the present invention, a partial iterative detection and decoding method in a MIMO system includes detecting signals received through at least one antenna to generate a first soft decision value, decoding the first soft decision value to generate a second soft decision value, checking a reliability of bits contained in the second soft decision value and determining whether a bit to be iteratively detected and decoded exists, and calculating a hard decision value of the second soft decision value when the bit to be iteratively detected and decoded does not exist.

According to the present invention, a partial iterative detection and decoding method in a MIMO system includes detecting signals received through at least one antenna to generate a first soft decision value, decoding the first soft decision value to generate a second soft decision value, checking reliability of bits contained in the first soft decision value and determining whether a bit to be iteratively detected and decoded exists, and calculating a hard decision value of the second soft decision value when the bit to be iteratively detected and decoded does not exist.

According to the present invention, a partial iterative detection and decoding method in a MIMO system includes detecting signals received through at least one antenna to generate a first soft decision value, decoding the first soft decision value to generate a second soft decision value, checking a channel state of the received signal to determine whether a bit to be iteratively detected and decoded exists in the second soft decision value, and calculating a hard decision value of the second soft decision value when the bit to be iteratively detected and decoded does not exist.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

In the following description, the MIMO system includes a single MIMO detector or a plurality of MIMO detectors. When only one MIMO receiver is provided, $N/N_TM$ number of TX signals is iteratively detected for a transmission time until LLR values with respect to bits having a coding block size of N are calculated. In addition, when an Orthogonal Frequency Division Multiplexing (OFDM) scheme is used, MIMO detectors can be independently implemented in parallel in the amount of the number of sub-carriers loading data. Here, $N_T$ represents the number of TX antennas and M represents the number of bits per symbol, which are transmitted by the TX antenna. Thus, $N_TM$ represents an amount of signals detected at a time by the MIMO detector.

Figure 2:
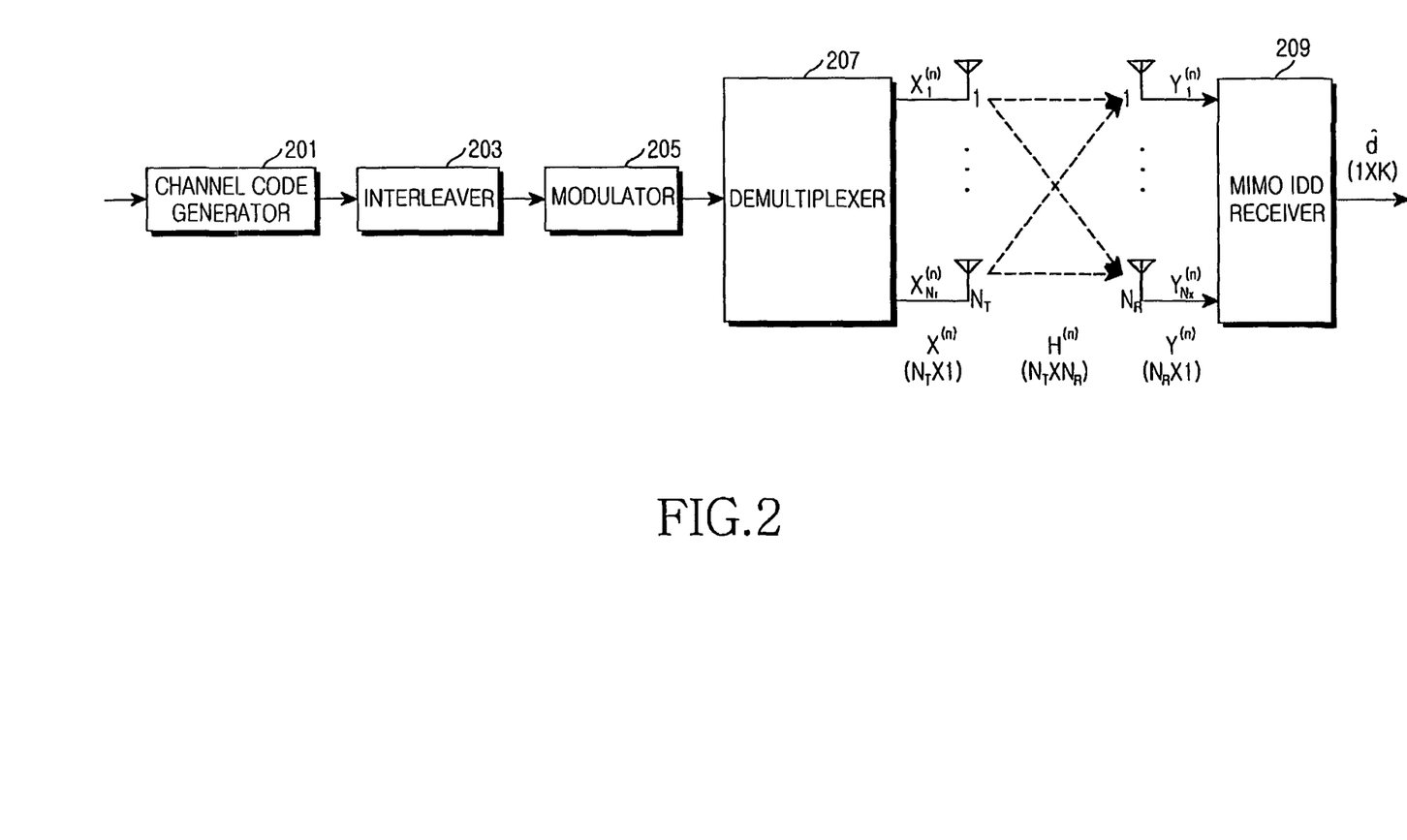
FIG. 2 is a diagram of a MIMO system according to the present invention.

FIG. 2 is a diagram of a MIMO system according to the present invention.

Referring to FIG. 2, a transmitter includes a channel code generator 201, an interleaver 203, a modulator 205, a demultiplexer 207 and a plurality of TX antennas. A receiver includes a plurality of TX antennas and a MIMO IDD receiver 209.

In the transmitter, the channel code generator 201 outputs code symbols by coding data bit streams at a given code rate. For example, the channel code generator 201 may be implemented with a convolutional encoder, a turbo encoder or a Low Density Parity Check (LDPC) encoder. The interleaver 203 interleaves the code symbols in accordance with a rule such that they are robust against burst error.

The modulator 205 modulates the interleaved symbols in a modulation scheme. That is, a complex signal is outputted by mapping a signal point on a constellation according to a mapping scheme such as a Binary Phase Shift Keying (BPSK) mapping one bit (s=1) on one complex signal, a Quadrature Phase Shift Keying (QPSK) mapping two bits (s=2) on one complex signal, an 8ary Quadrature Amplitude Modulation (8QAM) mapping three bits (s=3) on one complex signal and 16QAM mapping four bits (s=4) on one complex signal.

The demultiplexer 207 demultiplexes complex signals output from the modulator 205 and transmits the demultiplexed complex signals through $N_T$ TX antennas. Although not shown, when the MIMO system uses an OFDM scheme, the transmitter OFDM-modulates a plurality of streams output from the demultiplexer 207. Then, the transmitter Radio Frequency (RF)-processes the OFDM modulated signals such that they can be transmitted over a real wireless resource (e.g., the air), and transmits the RF signals through the corresponding antennas over the air.

The receiver receives the signals transmitted from the transmitter through a plurality of RX antennas. Although not shown, when the MIMO system uses an OFDM scheme, the RF signals received through the RX antennas are converted into time-domain baseband sample data, which data is OFDM-demodulated and input to the MIMO IDD receiver 209.

The MIMO IDD receiver 209 determines the reliability of the signals received through the RX antennas and performs a partial IDD according to the determined reliability. In addition, the MIMO IDD receiver 209 calculates a hard decision value of a signal having a high level of reliability.

Figure 3:
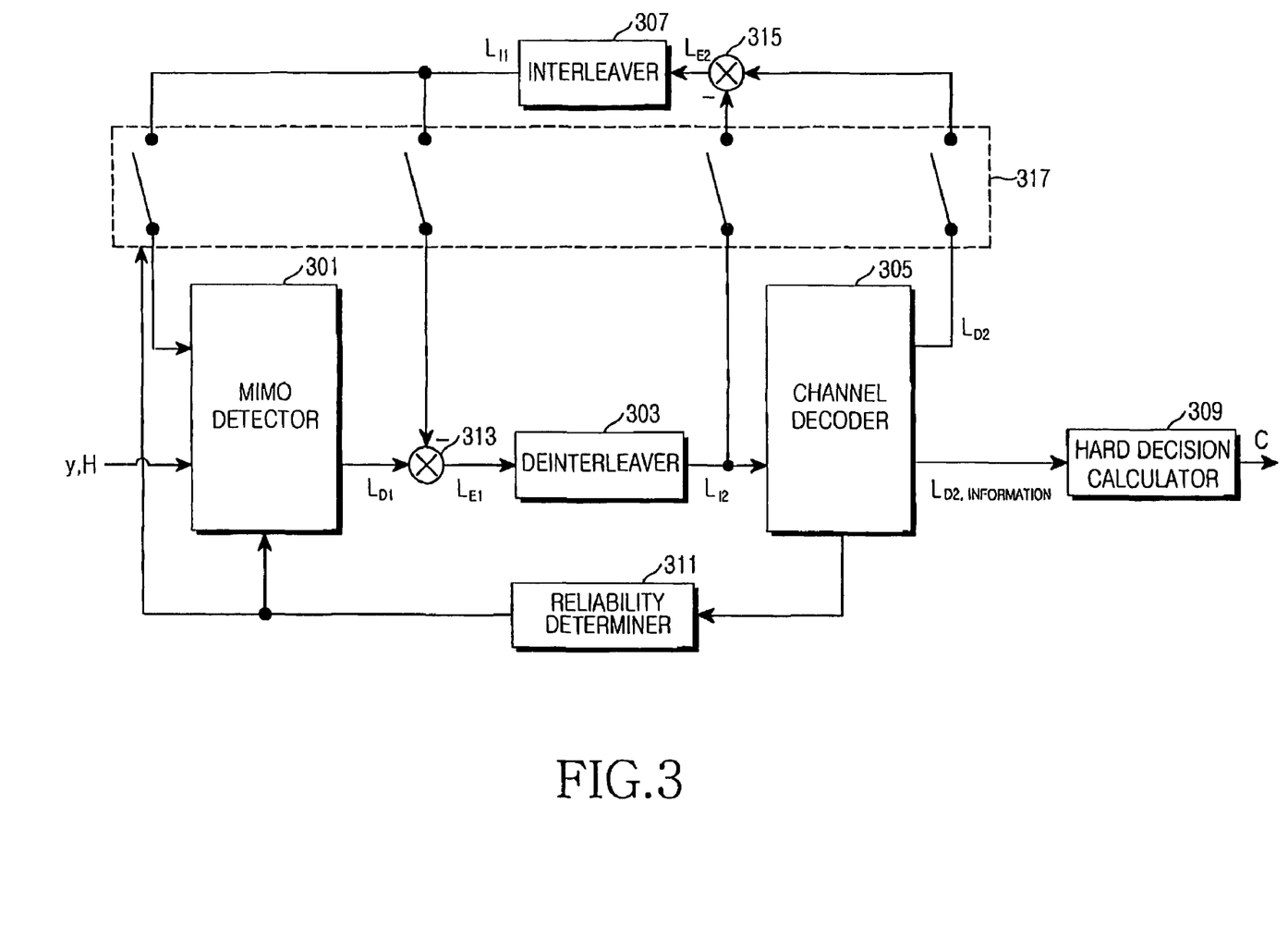
FIG. 3 is a diagram of a partial IDD apparatus of a MIMO receiver according to a first embodiment of the present invention.

FIG. 3 is a diagram of a partial IDD apparatus of a MIMO receiver according to a first embodiment of the present invention. A case where the channel decoder 305 determines the reliability using the decoded bits will be taken as an example. A soft decision value herein includes priori, posteriori and extrinsic information.

Referring to FIG. 3, the MIMO receiver includes a MIMO detector 301, a deinterleaver 303, a channel decoder 305, an interleaver 307, a hard decision calculator 309, a reliability determiner 311 and multipliers 313 and 315.

The MIMO detector 301 calculates first posteriori information $L_{D1}$ for each bit through the detection of the received signal using first priori information $L_{I1}$. The first posteriori information $L_{D1}$ has an LLR expressed as Equation (1) below. That is, the first posteriori information has a soft decision value. Because the first priori information does not exist in a first iteration, the probability of +1 and −1 is initiated to ½. In Equation (1), $$L_{D1}(c_k \mid y) = \ln \frac{P[c_k = +1 \mid y]}{P[c_k = -1 \mid y]} \quad (1)$$

where y denotes the RX signal vector, $c_k$ denotes a $k^{th}$ bit of the RX signal, and $P(c_k=+1|y)$ denotes the probability that the $k^{th}$ bit is +1 when receiving the RX signal vector.

A sphere decoder is used when the MIMO detector 301 employs the list MIMO scheme, while an interference eliminator such as zero forcing and MMSE can be used when the MIMO detector 301 employs the turbo blast scheme.

The first multiplier 313 calculates first extrinsic information $L_{E1}$ using a difference between the first posteriori information $L_{D1}$ of the MIMO detector 301 and the first priori information $L_{I1}$. The first posteriori information $L_{D1}$ of the MIMO detector 301 includes a sum of the first priori information $L_{I1}$ and the first extrinsic information $L_{E1}$ as given by Equation (2) below. Therefore, the first extrinsic information $L_{E1}$ can be calculated using the difference between the first posteriori information $L_{D1}$ and the first priori information $L_{I1}$. When the first extrinsic information is first calculated, it has the same value as the first posteriori information because the first priori information does not exist. In Equation (2), $$L_{D1}(c_k \mid y) = \ln \frac{P[c_k = +1 \mid y]}{P[c_k = -1 \mid y]} \quad (2)$$
$$= \ln \frac{P[c_k = +1]}{P[c_k = -1]} + \ln \frac{P[y \mid c_k = +1]}{P[y \mid c_k = -1]}$$
$$= L_{I1}(c_k) + L_{E1}(c_k \mid y)$$

where $L_{I1}(c_k)$ denotes the first priori information, $L_{E1}(c_k)$ denotes the first extrinsic information, and $P(c_k=+1)$ denotes the probability that the $k^{th}$ bit is +1.

The deinterleaver 303 generates the second priori information $L_{I2}$ by deinterleaving the first extrinsic information output from the first multiplier 313 according to the rule corresponding to the interleaver 203 of the transmitter illustrated in FIG. 2.

The channel decoder 305 calculates the second posteriori information $L_{D2}$ by decoding the second priori information in accordance with a decoding scheme (e.g., Bahl Cocke Jelinek Raviv (BCJR) MAP decoding or a soft in/soft out Viterbi algorithm). That is, the channel decoder 305 decodes the second priori information $L_{I2}$ to calculate the error-corrected second posteriori information $L_{D2}$. At this point, the channel decoder 305 feeds back only the second posteriori information $L_{D2}$ having a low level of reliability to the MIMO detector 301 under control of the reliability determiner 311.

The reliability determiner 311 determines the reliability of the second posteriori information by comparing signs of the bits of the second posteriori information to the second priori information decoded by the channel decoder 305. For example, the reliability determiner 311 determines that the second posteriori information has a low level of reliability when its bit has an opposite sign to that of the second priori information.

In order to increase the reliability of the bit having the low level of reliability, the reliability determiner 311 controls a switch 317 to feed back the detected $N_T M$ bits (hereinafter MIMO symbol) together with the corresponding bit. That is, the switch 317 connects the channel decoder 305 to the second multiplier 315 in order to feed back the MIMO symbol having the low level of reliability under control of the reliability determiner 311. In addition, the switch 317 disconnects the second multiplier 315 from the channel decoder 305 so as not to feed back a MIMO symbol having a high level of reliability. The bit indicates each of the LLRs. That is, the reliability determiner 311 determines whether to feed back the second posteriori information by comparing the LLRs containing the second posteriori information to the second priori information.

The second multiplier 315 calculates the second extrinsic information $L_{E2}$ by removing the second priori information $L_{I2}$ from the second posteriori information $L_{D2}$ of the MIMO symbols to be fed back. That is, bit error of the LLRs contained in the second posteriori information fed back from the channel decoder 305 is corrected during the decoding process. The channel decoder 305 corrects the error of the LLRs generated from the MIMO detector 301. Therefore, the second multiplier 315 removes the LLRs from the second posteriori information so as not to feed back the error of the LLRs.

The interleaver 307 generates the first priori information by interleaving the second extrinsic information output from the second multiplier 315 in accordance with a rule.

The hard decision calculator 309 calculates hard decision values of the bits to which data exchange or LLR recalculation in the signals decoded by the channel decoder 305 is not performed in the reliability determiner 311. That is, the hard decision calculator 309 determines the hard decision values with respect to the MIMO symbols determined by the reliability determiner 311 as being reliable.

As described above, the reliability determiner 311 determines to perform the feedback procedure only on the MIMO symbol containing the bit of the second posteriori information, the sign of which is opposite to that of the second priori information. However, the reliability determiner 311 can also determine the feedback procedure according to the variation of the extrinsic information. That is, the reliability determiner 311 measures the LLR variation of the second posteriori information and the second priori information and determines the feedback of the MIMO symbols containing the corresponding LLR when the LLR variation is greater than a reference value.

In addition, when a parity bit such as a Low Density Parity Check (LDPC) code or a turbo code is contained, the reliability determiner 311 determines the feedback of MIMO symbols containing bits that do not satisfy a parity equation.

Figure 4:
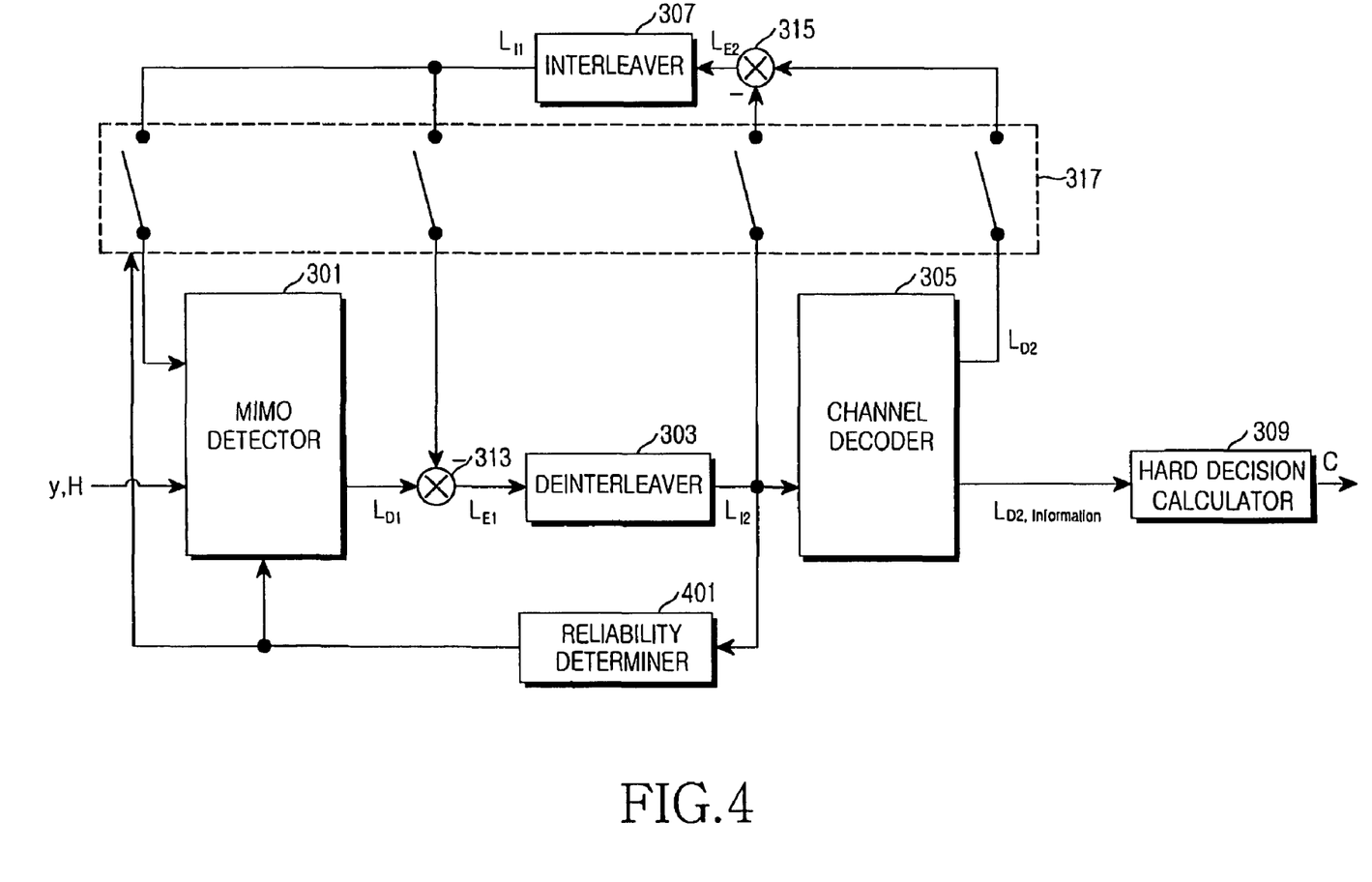
FIG. 4 is a diagram of a partial IDD apparatus of a MIMO receiver according to a second embodiment of the present invention.

FIG. 4 is a diagram of a partial IDD apparatus of a MIMO receiver according to a second embodiment of the present invention.

Referring to FIG. 4, the MIMO receiver includes a MIMO detector 301, a deinterleaver 303, a channel decoder 305, an interleaver 307, a hard decision calculator 309, a reliability determiner 401 and multipliers 313 and 315. Because the operations of the MIMO detector 301, the deinterleaver 303, the channel decoder 305, the interleaver 307, the hard decision calculator 309 and the multipliers 313 and 315 are identical to those of the elements illustrated in FIG. 3, their detailed description will be omitted for the sake of conciseness.

The reliability determiner 401 determines the reliability of the MIMO symbol by measuring the size of the bits contained in the second priori information inputted to the channel decoder 305. For example, when the size of the bit is less than a reference value, the reliability determiner 401 feeds back the second posteriori information because the reliability of the MIMO symbol containing the corresponding bit is low. The bit indicates each LLR. That is, the reliability determiner 401 determines whether to feed back the second posteriori information according to the LLR contained in the second priori information.

At this point, the reliability determiner 401 controls the switch 317 to feed back only the MIMO symbol having the low level of reliability in the second posteriori information.

Specifically, the switch 317 connects the channel decoder 305 to the second multiplier 315 in order to feed back the MIMO symbol having the low level of reliability under control of the reliability determiner 401. In addition, the switch 317 disconnects the second multiplier 315 from the channel decoder 305 so as not to feed back a MIMO symbol having a high level of reliability.

Figure 5:
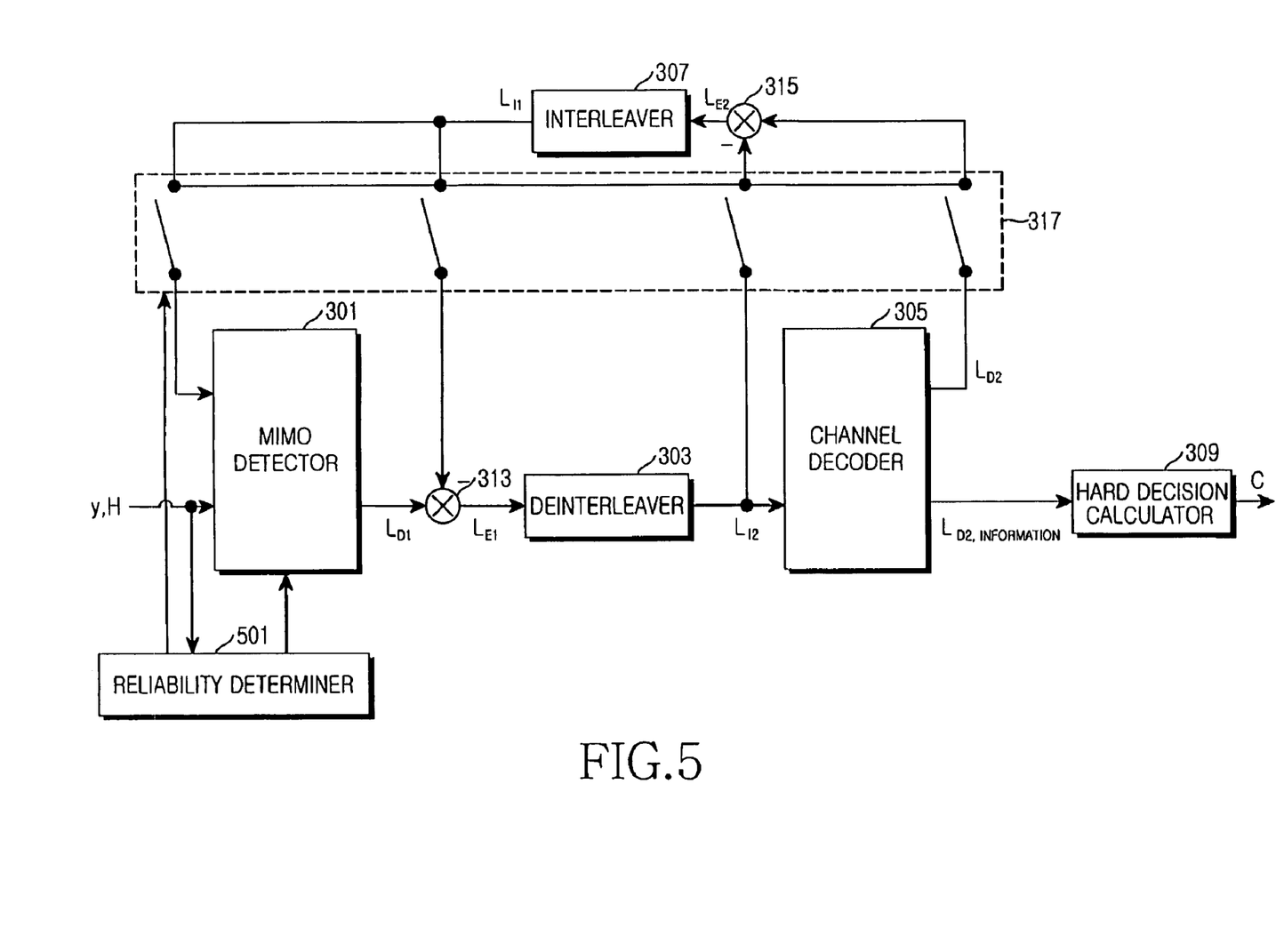
FIG. 5 is a diagram of a partial IDD apparatus of a MIMO receiver according to a third embodiment of the present invention.

FIG. 5 is a diagram of a partial IDD apparatus of a MIMO receiver according to a third embodiment of the present invention.

Referring to FIG. 5, the MIMO receiver includes a MIMO detector 301, a deinterleaver 303, a channel decoder 305, an interleaver 307, a hard decision calculator 309, a reliability determiner 501 and multipliers 313 and 315. Because the operations of the MIMO detector 301, the deinterleaver 303, the channel decoder 305, the interleaver 307, the hard decision calculator 309 and the multipliers 313 and 315 are identical to those of the elements illustrated in FIG. 3, their detailed description will be omitted for the sake of conciseness.

The reliability determiner 501 observes the signals input to the MIMO detector 301 and performs an IDD process only on the RX signals corresponding to channels having states that are less than a predetermined level. The channel states are measured using an Eigen value of a channel matrix, a Mean Square Error (MSE) and a Signal to Interference and Noise Ratio (SINR) according to a detection scheme of the MIMO detector 301. At this point, the reliability determiner 501 controls the switch 317 to feed back the MIMO symbols. That is, the switch 317 connects the channel decoder 305 to the second multiplier 315 in order to feed back a MIMO symbol having a low level of reliability under control of the reliability determiner 501. In addition, the switch 317 disconnects the second multiplier 315 from the channel decoder 305 so as not to feed back a MIMO symbol having a high level of reliability.

Figure 6:
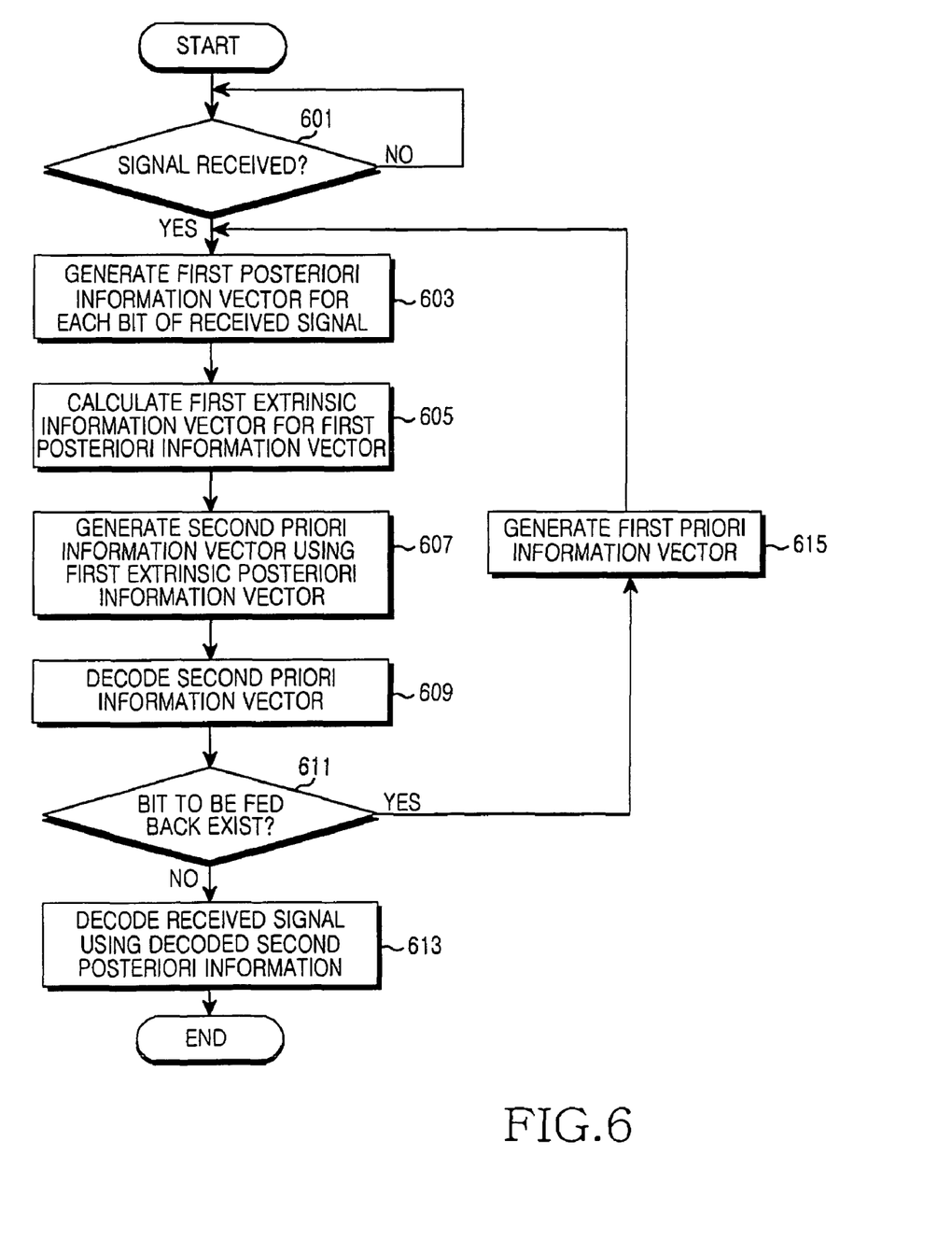
FIG. 6 is a flowchart illustrating a partial IDD method of a MIMO system according to the present invention.

FIG. 6 is a flowchart illustrating a partial IDD method of a MIMO system according to the present invention.

Referring to FIG. 6, the MIMO IDD receiver determines whether a signal is received from the MIMO transmitter in step 601.

In step 603, when the signal is received, the MIMO IDD receiver performs MIMO detection with respect to the received signal to generate the first posteriori information vector expressed as Equation (1).

In step 605, the MIMO IDD receiver calculates the first extrinsic information vector using the difference between the first posteriori information and the first priori information.

When the first extrinsic information vector is first calculated, it has the same value as the first posteriori information vector because the first priori information vector does not exist.

In step 607, the MIMO IDD receiver deinterleaves the first extrinsic information to generate the second priori information vector.

In step 609, the MIMO IDD receiver decodes the second priori information vector in accordance with a corresponding decoding scheme to calculate the second posteriori information. That is, the MIMO IDD receiver corrects the error of the second priori information vector to calculate the second posteriori information.

In step 611, the MIMO IDD receiver determines whether the bit to be fed back exists in the second posteriori information. For example, the MIMO IDD receiver determines the MIMO symbol to be fed back by using the second posteriori information, the second priori information or the received signal. When the second posteriori information is used, the MIMO IDD receiver compares bit signs of the second priori information to the second posteriori information and determines to feed back the MIMO symbol containing the bit having an inverted sign. In addition, the MIMO IDD receiver determines to feed back the MIMO symbol containing an LLR (=bit) having a variation of the second posteriori information that is greater than a reference value.

When the second priori information is used, the MIMO IDD receiver determines to feed back the MIMO symbol containing the bit of the second priori information, a size of which is less than a reference value.

When the received signal is used, the MIMO IDD receiver checks the channel state of the received signal and determines to feed back the MIMO symbol contained in the channel having a state that is less than a predetermined level.

In step 615, when the bit to be fed back exists, the MIMO IDD receiver feeds back the MIMO symbol containing the corresponding bit to generate the first priori information vector. At this point, the first priori information vector calculates the second extrinsic information vector by removing the second priori information vector component from the fed-back second posteriori information vector. The second extrinsic information vector is deinterleaved to generate the first priori information vector. The bit error of the LLRs contained in the fed-back second posteriori information is corrected during the decoding process. That is, the MIMO IDD receiver performs the decoding process to correct the error of the LLR contained in the second priori information. Therefore, the MIMO IDD receiver removes the second priori information component from the second posteriori information so as not to feed back the error contained in the second priori information.

Then, the MIMO IDD receiver returns to step 603 to perform the IDD process. In step 613, when the bit to be fed back does not exist, the MIMO IDD receiver calculates the hard decision value using the second posteriori information. Then, the MIMO IDD receiver terminates the algorithm.

As described above, the MIMO IDD receiver detects the bit for the IDD using the posteriori information, the second priori information or the channel state of the received signal. The present invention is not limited thereto, and the respective methods can be combined. The MIMO detection can be performed in each iteration to recalculate the LLR. After performing the MIMO detection once at the initial iteration, the error correction of the LLR generated at a next iteration can be performed.

Figure 7:
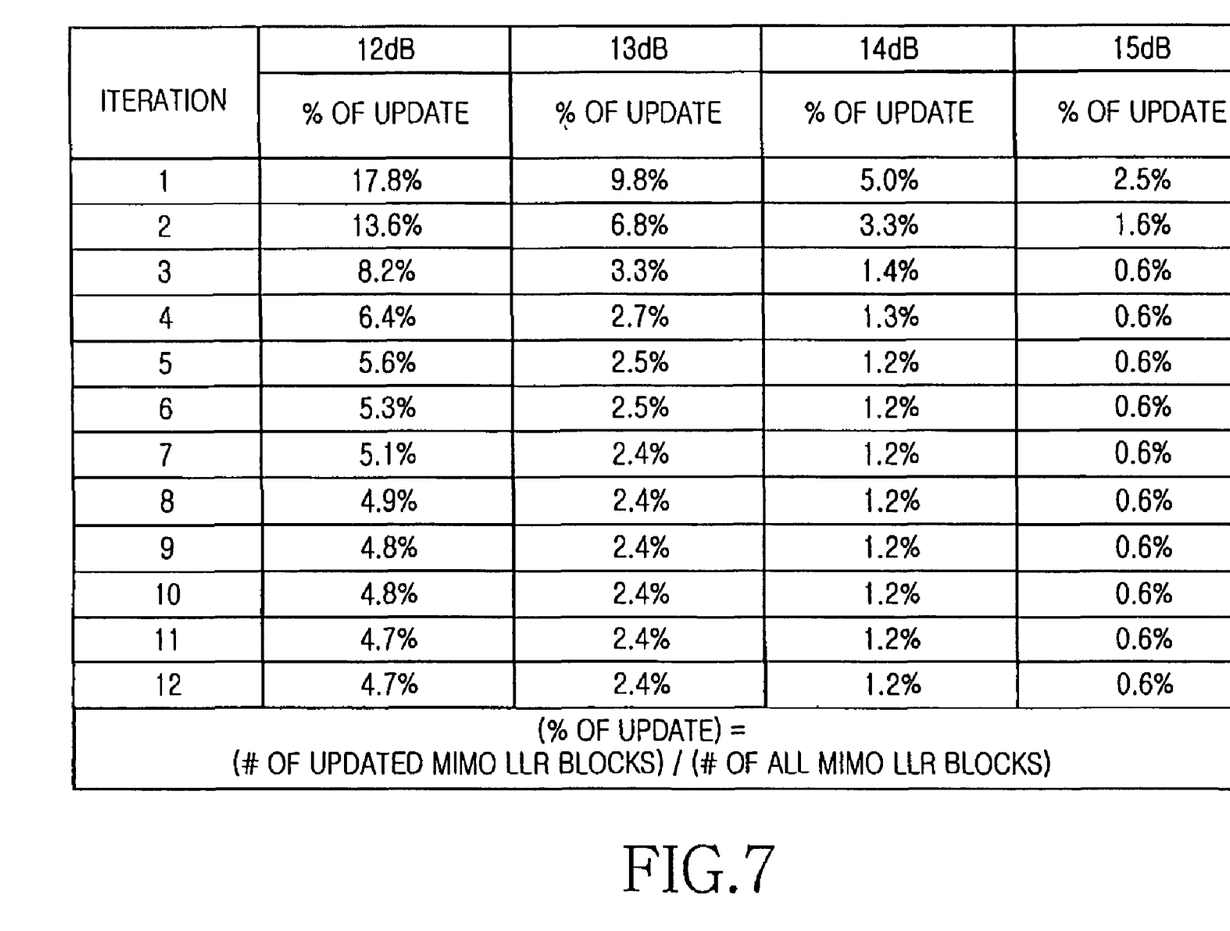
FIG. 7 is a diagram illustrating the complexity when a partial IDD is performed in a MIMO system according to the present invention.

FIG. 7 is a diagram illustrating the complexity when a partial IDD is performed in a MIMO system according to the present invention. A 4×4 MIMO OFDM system was used, a Fast Fourier Transformation (FFT) size was 4096, a modulation scheme was a 16QAM, and a sorted MML was used as a detection scheme. In addition, a channel code was a ⅚ rate LDPC code, and a 9-tap exponential decay channel using a packet size of 12,608 bits/packet was used.

As can be seen from FIG. 7, the complexity decreases as the number of iterations increases. That is, when detection and decoding are iteratively performed, the number of iterative MIMO LLR blocks decreases as the number of iterations increases, thereby reducing the complexity.

As described above, when the IDD process is performed in the MIMO system, the signal reliability is determined to feed back some but not all of the signals. Consequently, the complexity of the receiver reduces and the number of the iterations limited due to the complexity increases, thereby improving the performance of the receiver.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A partial iterative detection and decoding apparatus in a Multiple Input Multiple Output (MIMO) system, comprising:
    a detector for detecting signals received through at least one receive antenna and generating a first soft decision value;
    a decoder for generating a second soft decision value by decoding the first soft decision value; and
    a switch for connecting the decoder and the detector in order to feedback a MIMO symbol having a low level of reliability under control of a reliability determiner and for disconnecting the detector from the decoder so as not to feedback a MIMO symbol having a high level of reliability,
    wherein the reliability determiner selects a signal from a plurality of signals to be iteratively detected and decoded by using the second soft decision value,
    wherein the reliability determiner compares a reference value with a variation of log likelihood ratios of the first soft decision value and the second soft decision value, and determines to perform the iterative detection and decoding process on a signal containing a bit having a log likelihood ratio that is greater than the reference value.

2. The partial iterative detection and decoding apparatus of claim 1, wherein the first soft decision value and the second soft decision value include a log likelihood ratio.

3. The partial iterative detection and decoding apparatus of claim 1, wherein the detector generates the first soft decision value using the received signal and the signal to be iteratively detected and decoded.

4. The partial iterative detection and decoding apparatus of claim 3, wherein the detector uses a receiver that separates MIMO signals using at least one of a sphere decoding scheme, a zero forcing scheme, and a Minimum Mean Square Error (MMSE) scheme.

5. The partial iterative detection and decoding apparatus of claim 1, further comprising:
    a deinterleaver for deinterleaving the first soft decision value and outputting the deinterleaved first soft decision value to the decoder; and
    an interleaver for interleaving the signal to be iteratively detected and decoded, and outputting the interleaved signal to the detector.

6. The partial iterative detection and decoding apparatus of claim 1, further comprising:
    a first subtractor for removing the signal to be iteratively detected and decoded from the first soft decision value output from the detector; and
    a second substractor for removing the first soft decision value from the signal to be iteratively detected and decoded from the decoder.

7. The partial iterative detection and decoding apparatus of claim 1, wherein the signal to be iteratively detected and decoded is a MIMO symbol unit.

8. A partial iterative detection and decoding apparatus in a Multiple Input Multiple Output (MIMO) system, comprising:
    a detector for detecting signals received through at least one antenna and generating a first soft decision value;
    a decoder for decoding the first soft decision value and generating a second soft decision value; and
    a switch for connecting the decoder and the detector in order to feedback a MIMO symbol having a low level of reliability under control of a reliability determiner and for disconnecting the detector from the decoder so as not to feedback a MIMO symbol having a high level of reliability,
    wherein the reliability determiner measures a magnitude of the first soft decision value and selects a signal from a plurality of signals to be iteratively detected and decoded among the second soft decision value,
    wherein the reliability determiner selects the bit to be iteratively detected and decoded and measures sizes of bits to be iteratively detected and decoded, and compares the measured bit sizes with a reference value, and determines to perform an iterative detection and decoding process on the signal including the bits having a size that is less than the reference value in the second soft decision value.

9. The partial iterative detection and decoding apparatus of claim 8, wherein the first soft decision value and the second soft decision value include a log likelihood ratio.

10. The partial iterative detection and decoding apparatus of claim 8, wherein the detector generates the first soft decision value using the received signal and the signal to be iteratively detected and decoded.

11. The partial iterative detection and decoding apparatus of claim 10, wherein the detector uses a receiver that separates MIMO signals using at least one of a sphere decoding scheme, a zero forcing scheme, and a Minimum Mean Square Error (MMSE) scheme.

12. The partial iterative detection and decoding apparatus of claim 8, further comprising:
    a deinterleaver for deinterleaving the first soft decision value and outputting the deinterleaved first soft decision value to the decoder; and
    an interleaver for interleaving the signal to be iteratively detected and decoded in the decoder, and outputting the interleaved signal to the detector.

13. The partial iterative detection and decoding apparatus of claim 8, further comprising:
    a first subtractor for removing the signal to be iteratively detected and decoded from the first soft decision value output from the detector; and
    a second substractor for removing the first soft decision value from the signal to be iteratively detected and decoded.

14. The partial iterative detection and decoding apparatus of claim 8, wherein the signal to be iteratively detected and decoded is a MIMO symbol unit.

15. A partial iterative detection and decoding apparatus in a Multiple Input Multiple Output (MIMO) system, comprising:
- a detector for detecting signals received through at least one antenna and generating a first soft decision value;
- a decoder for decoding the first soft decision value and generating a second soft decision value; and
- a switch for connecting the decoder and the detector in order to feedback a MIMO symbol having a low level of reliability under control of a reliability determiner and for disconnecting the detector from the decoder so as not to feedback a MIMO symbol having a high level of reliability,
- wherein the reliability determiner selects a signal from a plurality of signals to be iteratively detected and decoded among the second soft decision values according to a channel state of the received signal,
- wherein the reliability determiner selects the bit to be iteratively detected and decoded, and checks the channel state of the received signal, and compares the channel state with a reference value, and determines to perform an iterative detection and decoding process on a signal corresponding to the channel in the second soft decision value when the channel state is less than the reference value.

16. The partial iterative detection and decoding apparatus of claim 15, wherein the first soft decision value and the second soft decision value include a log likelihood ratio.

17. The partial iterative detection and decoding apparatus of claim 15, wherein the detector generates the first soft decision value using the received signal and the signal to be iteratively detected and decoded.

18. The partial iterative detection and decoding apparatus of claim 17, wherein the detector uses a receiver that separates MIMO signals using at least one of a sphere decoding scheme, a zero forcing scheme, and a Minimum Mean Square Error (MMSE) scheme.

19. The partial iterative detection and decoding apparatus of claim 15, further comprising:
- a deinterleaver for deinterleaving the first soft decision value and outputting the deinterleaved first soft decision value to the decoder; and
- an interleaver for interleaving the signal to be iteratively detected and decoded in the decoder, and outputting the interleaved signal to the detector.

20. The partial iterative detection and decoding apparatus of claim 15, further comprising:
- a first subtractor for removing the signal to be iteratively detected and decoded from the first soft decision value output from the detector; and
- a second substractor for removing the first soft decision value from the signal to be iteratively detected and decoded.

21. The partial iterative detection and decoding apparatus of claim 15, wherein the reliability determiner determines the channel state using one of an Eigen value of a channel matrix, a Mean Squared Error (MSE), and a Signal to Interference and Noise Ratio (SINR) according to a MIMO detection scheme.

22. A partial iterative detection and decoding method in a Multiple Input Multiple Output (MIMO) system, comprising the steps of:
- detecting signals received through at least one antenna and generating a first soft decision value;
- decoding the first soft decision value and generating a second soft decision value;
- checking a reliability of bits included in the second soft decision value and selecting a bit to be iteratively detected and decoded if the bit has a low reliability; and
- calculating a hard decision value of the second soft decision value when no bit is selected to be iteratively detected and decoded,
- wherein selecting the bit to be iteratively detected and decoded further comprises:
- checking log likelihood ratios of the first soft decision value and the second soft decision value;
- comparing a variation of the log likelihood ratios with a reference value; and
- determining to perform an iterative detection and decoding process on a signal including a bit having a variation that is greater than the reference value.

23. The partial iterative detection and decoding method of claim 22, wherein the first soft decision value is generated using the received signal and the signal to be iteratively detected and decoded.

24. The partial iterative detection and decoding method of claim 22, further comprising:
- removing the signal to be iteratively detected and decoded from the first soft decision value; and
- deinterleaving the first soft decision value in which the signal to be iteratively detected and decoded is removed,
- wherein the second soft decision value is generated by decoding the deinterleaved first soft decision value.

25. The partial iterative detection and decoding method of claim 22, further comprising feeding back a MIMO symbol including the bit to be iteratively detected and decoded among the second soft decision value to the process of generating the first soft decision value.

26. The partial iterative detection and decoding method of claim 22, wherein the first soft decision value and the second soft decision value include a log likelihood ratio.

27. A partial iterative detection and decoding method in a Multiple Input Multiple Output (MIMO) system, comprising the steps of:
- detecting signals received through at least one antenna and generating a first soft decision value;
- decoding the first soft decision value and generating a second soft decision value;
- checking reliability of bits included in the first soft decision value and selecting a bit to be iteratively detected and decoded if the bit has a low reliability; and
- calculating a hard decision value of the second soft decision value when no bit is selected to be iteratively detected and decoded,
- wherein selecting the bit to be iteratively detected and decoded further comprises:
- measuring sizes of bits to be iteratively detected and decoded;
- comparing the measured bit sizes with a reference value; and
- determining to perform an iterative detection and decoding process on a signal including the bits having a size that is less than the reference value in the second soft decision value.

28. The partial iterative detection and decoding method of claim 27, wherein the first soft decision value is generated using the received signal and the signal to be iteratively detected and decoded.

29. The partial iterative detection and decoding method of claim 27, further comprising:
- removing the signal to be iteratively detected and decoded from the first soft decision value; and deinterleaving the first soft decision value in which the signal to be iteratively detected and decoded is removed, wherein the second soft decision value is generated by decoding the deinterleaved first soft decision value.

30. The partial iterative detection and decoding method of claim 27, further comprising feeding back a MIMO symbol including the bit to be iteratively detected and decoded in the second soft decision value to the process of generating the first soft decision value.

31. The partial iterative detection and decoding method of claim 27, wherein the first soft decision value and the second soft decision value include a log likelihood ratio.

32. A partial iterative detection and decoding method in a Multiple Input Multiple Output (MIMO) system, comprising the steps of:
   detecting signals received through at least one antenna and generating a first soft decision value;
   decoding the first soft decision value and generating a second soft decision value;
   checking a channel state of the received signal to select a bit to be iteratively detected and decoded from the second soft decision value; and
   calculating a hard decision value of the second soft decision value if no bit to be iteratively detected and decoded was selected,
   wherein selecting the bit to be iteratively detected and decoded further comprises:
   checking the channel state of the received signal;
   comparing the channel state with a reference value; and
   determining to perform an iterative detection and decoding process on a signal corresponding to the channel in the second soft decision value when the channel state is less than the reference value.

33. The partial iterative detection and decoding method of claim 32, wherein the first soft decision value is generated using the received signal and the signal to be iteratively detected and decoded.

34. The partial iterative detection and decoding method of claim 32, further comprising:
   removing the signal to be iteratively detected and decoded from the first soft decision value; and
   deinterleaving the first soft decision value in which the signal to be iteratively detected and decoded is removed,
   wherein the second soft decision value is generated by decoding the deinterleaved first soft decision value.

35. The partial iterative detection and decoding method of claim 32, wherein the channel state is checked using one of an Eigen value of a channel matrix, a Mean Squared Error (MSE), and a Signal to Interference and Noise Ratio (SINR) according to a MIMO detection scheme.

36. The partial iterative detection and decoding method of claim 32, further comprising feeding back a MIMO symbol including the bit to be iteratively detected and decoded among the second soft decision value to the process of generating the first soft decision value.

37. The partial iterative detection and decoding method of claim 32, wherein the first soft decision value and the second soft decision value include log likelihood ratios.

* * * * *